Sept. 10, 1929.   H. A. AFFEL   1,727,388

HIGH FREQUENCY MEASURING SYSTEM

Original Filed Nov. 21, 1924

INVENTOR.
H. A. Affel
BY
ATTORNEY

Patented Sept. 10, 1929.

1,727,388

UNITED STATES PATENT OFFICE.

HERMAN A. AFFEL, OF RIDGEWOOD, NEW JERSEY, ASSIGNOR TO AMERICAN TELEPHONE AND TELEGRAPH COMPANY, A CORPORATION OF NEW YORK.

HIGH-FREQUENCY MEASURING SYSTEM.

Original application filed November 21, 1924, Serial No. 751,406. Divided and this application filed September 17, 1927. Serial No. 220,235.

This invention relates to high frequency measuring systems and particularly to means for measuring the impedance of a circuit at high frequencies.

This is a division of the applicant's copending application, Serial No. 751,406, filed November 21, 1924.

As is well known to those familiar with the art, apparatus which is entirely satisfactory for the measurement of low frequency currents proves inadequate when high frequency currents are to be measured. One of the objects of the present invention is to measure high frequency currents and potentials, the method for doing which consists in balancing an unknown direct current potential by a known potential, the direct current potential being produced by rectification or other method of conversion of unknown and known currents respectively, of frequencies at which it is desired to measure. By translating the alternating currents into proportional direct current potentials and by opposing these potentials in a circuit having a center zero galvanometer, a visual indication of the balance of the high frequency currents is thereby afforded, and it is possible to eliminate serious errors in the testing apparatus heretofore used for the measurement directly of high frequency currents.

Another object of this invention is to determine the magnitude of an unknown impedance for high frequency currents. A further object of the invention is to determine the frequency of a current by utilizing the general principles set forth hereinbefore.

Figure 1:
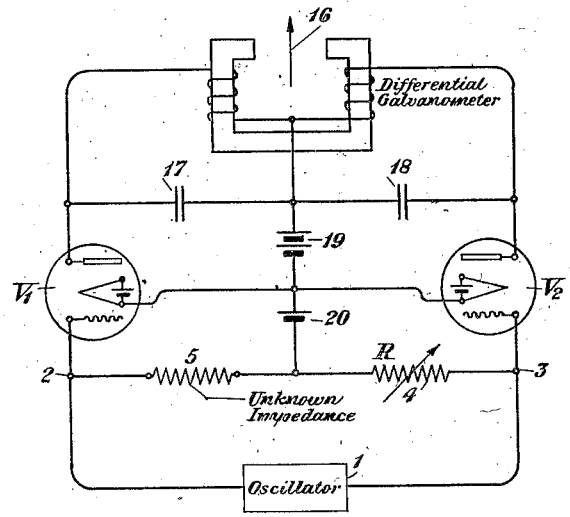
Figure 2:
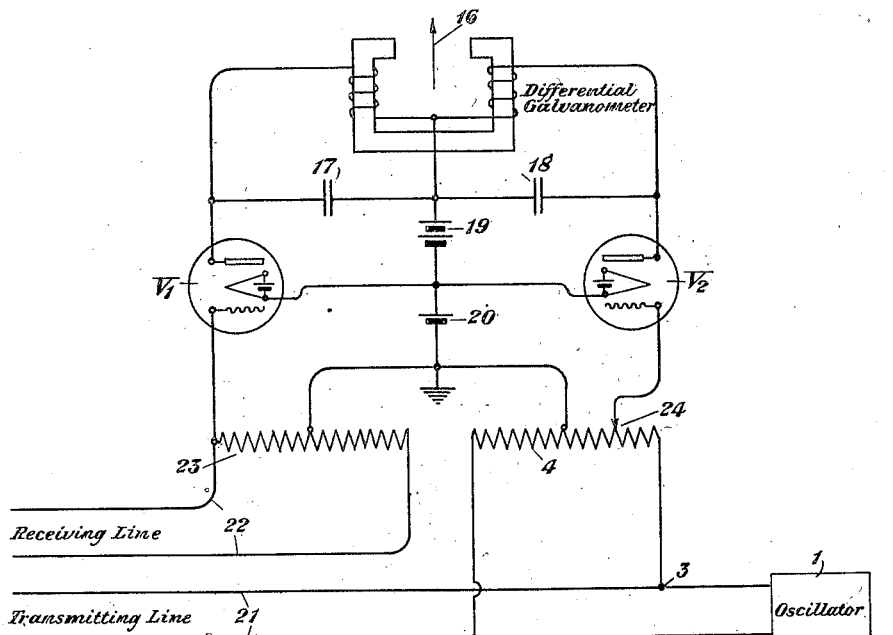

This invention will be clearly understood from the following description when read in connection with the attached drawing, of which Figure 1 shows means for measuring an unknown impedance employing balanced vacuum tubes; and Fig. 2 shows means employing vacuum tubes for crosstalk measurements, based upon the same principle underlying the impedance measurement systems.

In the arrangements shown in Figs. 1 and 2, vacuum tubes have been used for translating the high frequency measuring currents into direct current potentials for effecting a balance in the circuit containing the indicating device. In Fig. 1, a source of high frequency alternating current 1 is connected across the terminals 2 and 3 of a branch containing an unknown impedance 5 and a known variable resistance 4. The source 1 is also connected with the grids of the vacuum tubes $V_1$ and $V_2$. The junction point of the elements 2 and 3 is connected with the filaments of the vacuum tubes, the connection including the biasing battery 20. The output circuit of these tubes comprises a differential galvanometer 16, so connected as to be affected by a difference in the plate currents of the tubes. Condensers 17 and 18 are connected across the output circuit to shunt any high frequency currents that may be present in the output side of the tubes.

In order to produce zero deflection upon the differential galvanometer the voltage across the variable resistance 4 must be made equal to that across the unknown impedance 5 since the currents in both cases are one and the same, and the impedance between the filament and the grid circuits of the tubes is very large compared to that of the unknown impedance 5 under measurement. That is to say, the high frequency testing current from the source 1 will flow through the branch containing the impedance 5 and the resistance 4 and will cause a difference of potential across each of these elements. If these differences in potential are unequal, the grid voltages of the respective tubes will be different, and consequently the currents flowing in the plate circuits of the tubes will be different, thereby producing a resultant direct current which will cause a movement of the needle of the galvanometer 16. By varying the magnitude of the resistance 4 the voltages applied to the grids may be made substantially equal, which will be evidenced by the position of the needle of the galvanometer. When this condition obtains the reading of the resistance 4 will be a measurement of the total impedance of the unknown impedance 5. The foregoing method, however, does not indicate the distribution of the resistance and the reactance components of this impedance.

The arrangement shown in Fig. 2 is designed for measuring the high frequency crosstalk, namely, the interfering current produced in one circuit when current is transmitted over another parallel circuit, which interfering current is due to capacity or inductance unbalance existing in or between the said circuits. In Fig. 2 the source of high frequency current 1 is connected directly with the transmitting line 21. Bridged across the terminals 2 and 3 of the transmitting line is a variable resistance 4, in the nature of a potentiometer, which is connected with the grid and filament of the vacuum tube $V_2$ of the balance indicating device. The receiving line 22, namely, that in which the interfering crosstalk current is set up, is connected with another resistance 23, also in the nature of a potentiometer, which is connected with the grid and filament of the vacuum tube $V_1$. The output sides of these vacuum tubes are connected with a common output circuit which includes the differential galvanometer 16 and condensers 17 and 18. When the oscillator 1 is applying high frequency currents to the line 21 for transmission thereover, a definite amount of this current will flow through resistance 4, thereby producing a difference of potential across the terminals thereof equal to the potential created by the source 1. The crosstalk current set up in the line 22 will flow through the resistance 23 and produce a difference of potential across its terminals, a proportional part of which is applied between the grid and the filament of the tube $V_1$. By varying the position of the movable contact point 24 upon the resistance 4, the potential applied to the tube $V_2$ may be made equal to that applied to the tube $V_1$, so that the plate currents of both tubes will be equal. When this condition obtains, the direct current flowing through the windings of the differential galvanometer 16 will be equal and opposite and no deflection of the needle thereof will result. When the system is balanced, as outlined above, the proportionate resistance spanned by the connecting circuits of the grids of the tubes $V_1$ and $V_2$ will represent the current ratio between the transmitting and the receiving circuits, which if desired may be expressed in units of crosstalk or in miles of standard cable, which are well known standards of measurement.

It will be seen that by means of the arrangements shown and described herein, impedances and losses may be measured at high frequencies and with greater accuracy than possible heretofore by virtue of the translation of the high frequency currents into equivalent direct current potentials by suitable devices before measurement. While only the three-element vacuum tube has been shown for this purpose it is to be understood that any equivalent means for carrying out the principle of translation may also be used.

While this invention has been disclosed as embodied in particular forms it is to be understood that it is capable of embodiment in other forms without departing from the spirit and scope of the appended claims.

What is claimed is:

1. In a high impedance measuring circuit the combination with a source of alternating current of a Wheatstone bridge network having an unknown impedance constituting one arm of the network, a known resistance the second thereof, a differential indicating device the windings of which constitute the third and fourth arms, a rectifier connected in series with the said first and third arms and a second rectifier connected in series with the said second and fourth arms.

2. In a high impedance measuring circuit the combination with a Wheatstone bridge network comprising an unknown impedance constituting one arm of the network, a known variable resistance constituting the second arm thereof, a source of alternating current bridged across said arms, a vacuum tube rectifier having its grid connected with the said first arm, a differential indicating device having one winding connected with the plate of the said rectifier, a second vacuum tube rectifier having its grid connected with the second arm and its plate with the other winding of the said indicating device, and sources of current to activate the said vacuum tubes.

3. A cross-talk measuring device comprising a transmission circuit having a source of potential connected therewith, a receiving circuit exposed to cross-talk from the said transmission circuit, a known variable resistance bridged across the said transmission circuit at or near the sending end thereof, another known resistance bridged across the receiving circuit at the receiving end thereof, and a measuring circuit comprising balanced vacuum tube detectors having their filaments connected with the midpoint of each resistance and having the grid of one connected with one terminal of one resistance and the grid of the other variably connected with the other resistance, and a differential device connected with the plates of said detectors to be acted upon by the difference in the plate currents of the said vacuum tubes.

In testimony whereof, I have signed my name to this specification this 15th day of September, 1927.

HERMAN A. AFFEL.